Figure 1:
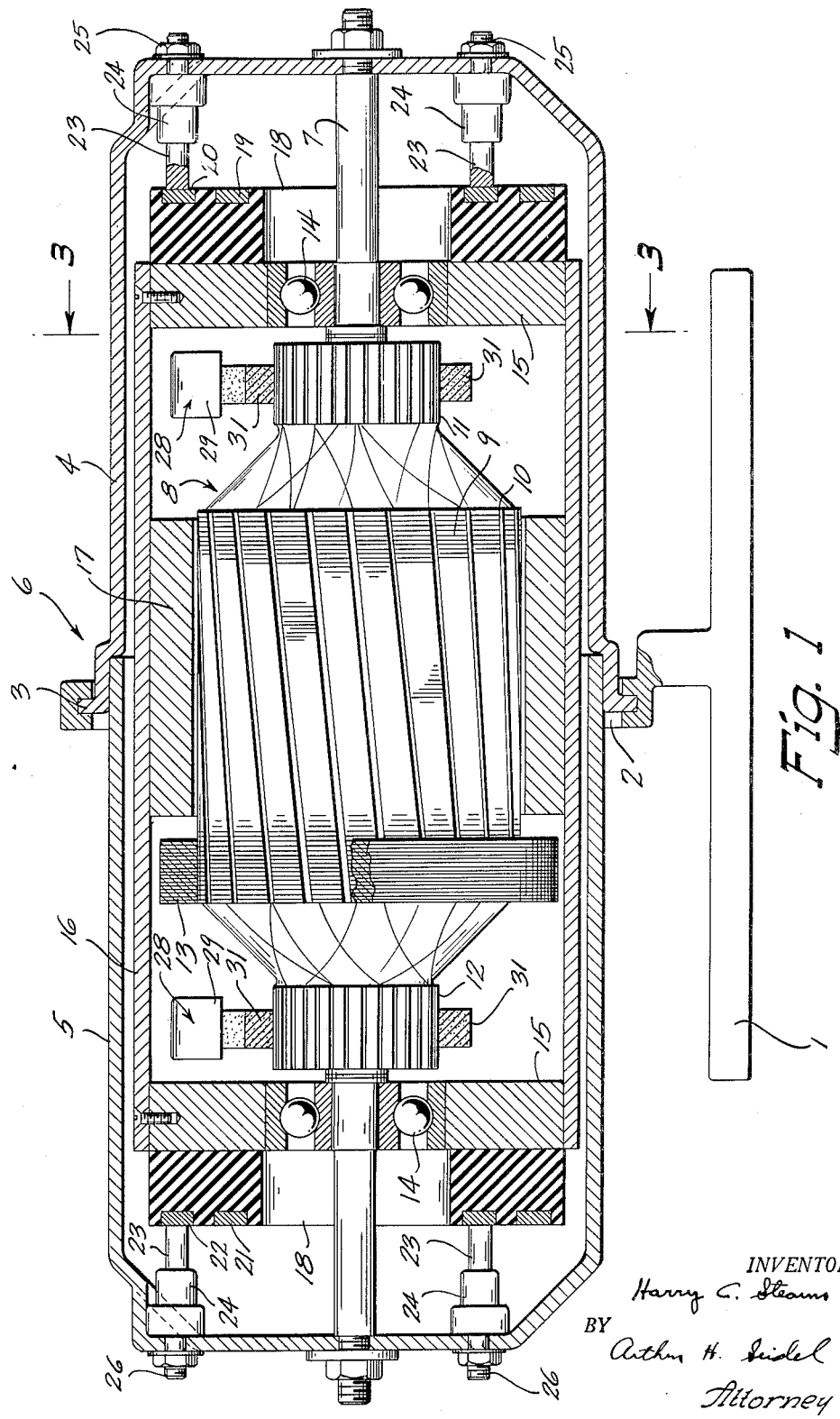

Sept. 6, 1955     H. C. STEARNS     2,717,321

DYNAMOTOR

Filed Aug. 20, 1951     3 Sheets-Sheet 1

INVENTOR.
Harry C. Stearns
BY Arthur H. Seidel
Attorney

Sept. 6, 1955        H. C. STEARNS        2,717,321
DYNAMOTOR
Filed Aug. 20, 1951                                       3 Sheets-Sheet 2
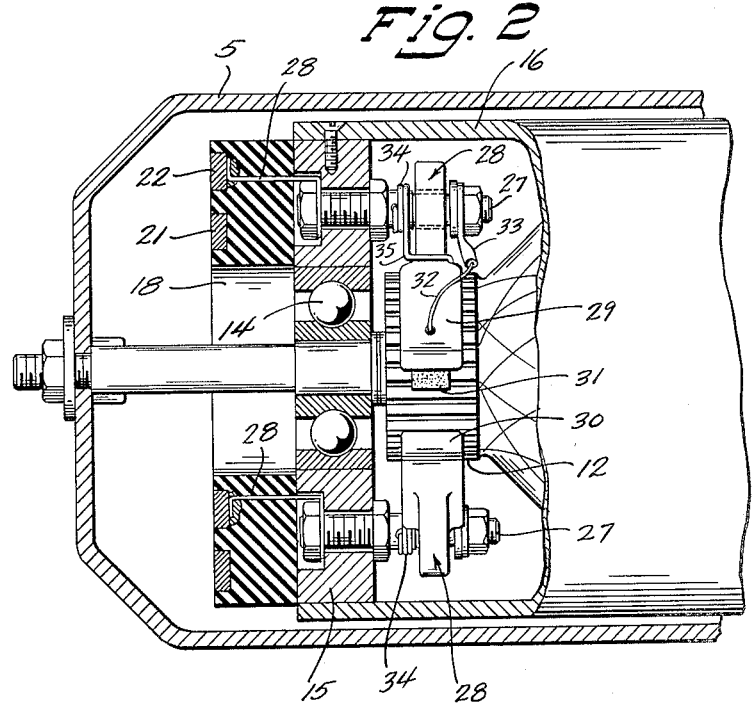
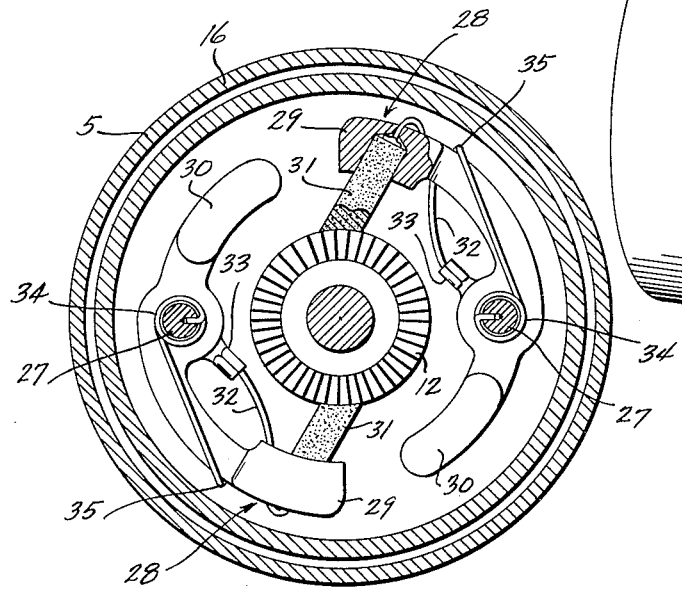
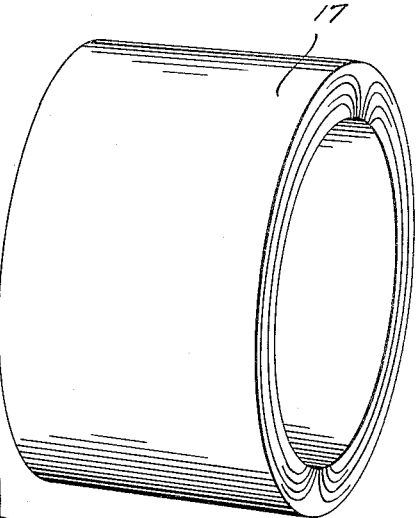
INVENTOR.
Harry C. Stearns
BY Arthur H. Seidel
Attorney Sept. 6, 1955      H. C. STEARNS      2,717,321
DYNAMOTOR
Filed Aug. 20, 1951      3 Sheets-Sheet 3
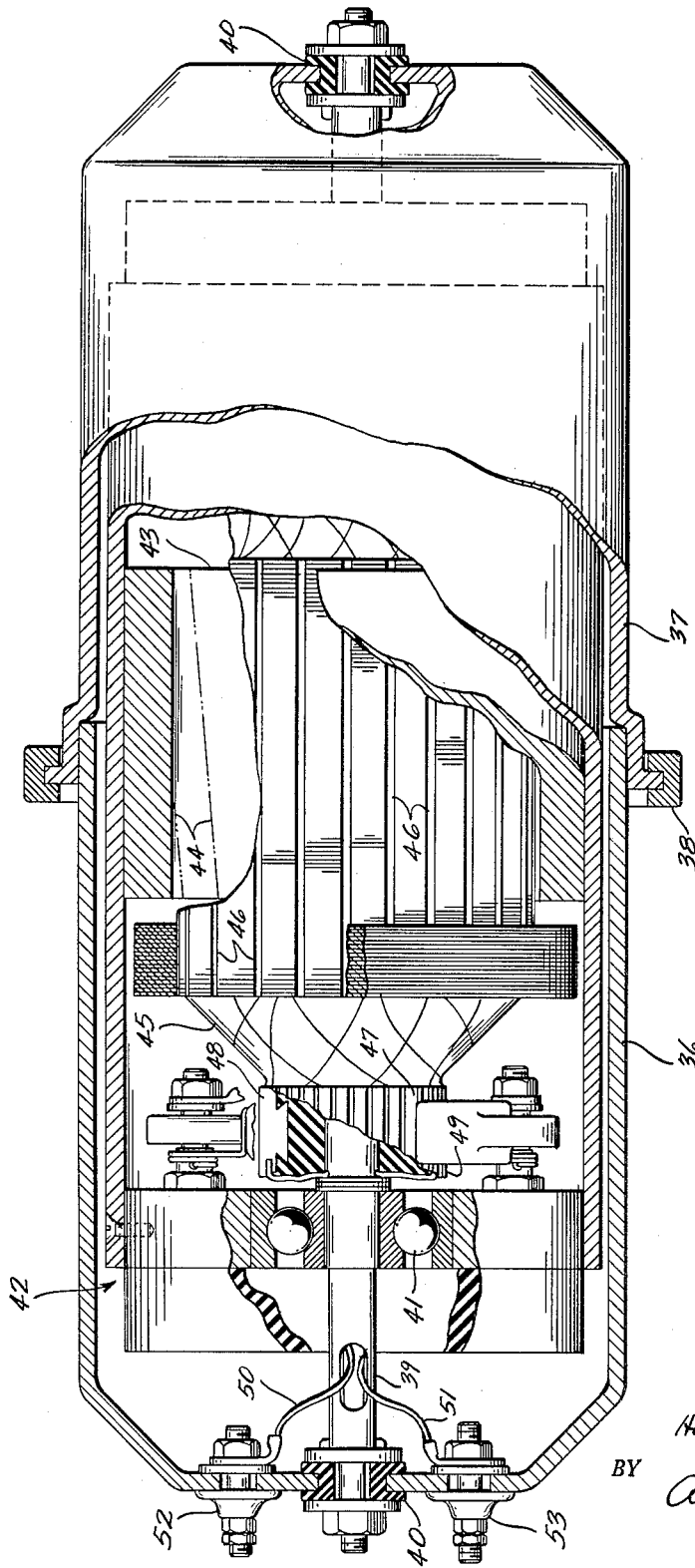

United States Patent Office 2,717,321
Patented Sept. 6, 1955

2,717,321

DYNAMOTOR

Harry C. Stearns, Glen Ellyn, Ill.

Application August 20, 1951, Serial No. 242,732

8 Claims. (Cl. 310—138)

This invention relates to dynamotors and it more specifically resides in a dynamotor having a non-rotating armature sometimes including magnetic material disposed to surround portions of the conductors of the separate sets of windings mounted within the armature slots to enhance coupling between the conductor portions and having a rotatable field member comprised in part of a hollow circular cylindrical permanent magnet of uniform cross section with magnetic poles circumferentially spaced one from the other on the inner surface, the field member being disposed to revolve about the armature and to transmit flux therethrough.

High voltage dynamotors require a large number of turns of fine wire for the secondary winding of the armature. Considerable mechanical difficulty has been encountered in the employment of such windings. Being subject to centrifugal forces during operation the windings must be securely held in the armature slots and conventional construction resorts to a wedged fit between the winding coils and the armature teeth to restrain outward movement of the winding coils in response to the rotational forces. To secure a wedged fit multiple turns of fine wire may be preformed into coils that are then suitably covered by tape or the like, which coils are then press fitted into the armature slots. Wedges may be employed to further insure restraint of movement of the winding coils. These methods frequently damage the turns of fine wire and cause open and short circuits. The insulation may also receive such abuse by this manner of assembly as to render it susceptible to breakdown after relatively short periods of operation of the dynamotor.

Resort has been made to the use of increased wrappings for the individual coils to cushion the wire strands during insertion in the armature slots. Increased wrappings tend to impair necessary heat transfer from the windings by entrapment of the generated heat within the windings. Resultant inadequate cooling aggravates insulation breakdowns. An increase in the coil wrappings also increases dynamotor size by reason of the larger coil overhangs that become extensive upon use of the additional wrapping.

It is an object of this invention to eliminate the imposition of rotational forces upon the windings of small size that are essential for high voltage dynamotors and to thereby permit the forming and mounting of armature winding coils to be accomplished in a manner that will not abuse the strands or the insulation covering the strands.

It is another object of this invention to enhance the magnetic coupling between the primary and secondary windings of a dynamotor armature to provide increased energy transfer between the windings arising from the mutual inductive relationship of the windings, thus augmenting generated voltage in the secondary to permit the use of fewer turns in the secondary for a given voltage rating.

It is still another object of this invention to uniformly distribute the mass of the rotating elements of a dynamotor about the axis of rotation by utilization of uniform circular cylindrical members that are inherently dynamically and statically balanced, thus minimizing balancing adjustments required in the course of manufacture.

These and other objects will appear in the description to follow. In the description reference is made to the accompanying drawings which form a part hereof and in which there is shown by way of illustration and not of limitation specific forms in which this invention may be embodied.

In the drawings:

Fig. 1 is a side view in cross section with parts broken away and in section of a dynamotor embodying this invention, Fig. 2 is a fragmentary top view in cross section of the left hand side of the dynamotor shown in Fig. 1, Fig. 3 is a view in cross section of the dynamotor shown in Fig. 1 viewed through the plane 3—3, Fig. 4 is a view in perspective of a permanent field magnet which forms a part of the dynamotor shown in Fig. 1, and Fig. 5 is a top view with parts broken away and in section of a dynamotor embodying another form of the invention.

Referring now to the drawings, there is shown in Fig. 1 a dynamotor having a pedestal 1 that forms a base support which is integrally attached to a vertical channel shaped hoop clamp 2. Fitted within the channel of the clamp 2 is a circular flange 3 of a right hand end bell 4 which is closed at the end opposite the flange 3. Telescoped for a small distance within the open flanged end of the end bell 4 is a left hand end bell 5 which is closed at its end opposite the telescoped portion thereof. The hoop clamp 2 is tightened about the flange portion 3 and thereby compresses the end bells 4 and 5 to hold them in the position as shown so as to form a cylindrical can type housing 6 that fully encloses the major parts of the dynamotor. Extending through the housing 6 in a concentric relation with the end bells 4 and 5 is a non-rotatable shaft 7 fastened to the respective ends of the end bells 4 and 5. The shaft 7 lends further rigidity to the housing 6 and serves as a mounting for a stator armature 8.

The armature 8 is keyed to the shaft 7 to prevent rotation and has a central drum shaped stack 9 composed of laminated magnetic material such as silicon steel. Deep slots 10 are cut or formed in the stack 9 to receive two sets of windings which are conventionally known as a primary winding and a secondary winding. Coils from each set of windings are placed in each of the slots 10 and the respective coils of one of these windings, for example the primary winding, is connected to the segments of a commutator 11 that forms a part of the armature 8 and the coils of the other winding, the secondary winding, are connected to the segments of a second commutator 12 that also forms a part of the armature 8. The above described construction of the armature 8 is similar to that of a conventional dynamotor with the exception that the armature 8 forms the stator of the described apparatus. The turns ratio of the respective windings is approximately proportional to the ratio of the input and output voltages of the dynamotor and for applications requiring large voltage ratios the coils forming the secondary windings will constitute many turns of fine wire.

An annular magnetic coupling ring 13 is press fitted to the armature 8 so as to surround a number of the circular laminated sections forming the stack 9 in which the winding coils are mounted. The coupling ring 12 is composed of a magnetic material and is shown in Fig. 1 as composed of laminated magnetic steel. The ring 13 may also be composed of other magnetic materials such as, for example, bonded powdered metal having the desired permeability characteristics. The purpose and function of the ring 13, which acts to form a closed magnetic path about each of the winding coils, will be hereinafter described in greater detail.

Disposed at the sides of the commutators 11 and 12 and mounted upon the shaft 7 are a pair of ball bearings 14 acting to support the rotatable field structure of the dynamotor. Each of the ball bearings 14 is fitted within an end disc 15, and a circular cylindrical field yoke 16 of uniform thickness is mounted upon and extends between the end discs 15 so as to rotate about the shaft 7 and armature 8. Carried within the field yoke 16 is a circular cylindrical permanent magnet 17 which is likewise of uniform thickness. The magnet 17 is "pattern" magnetized to form the pole pieces for the dynamotor and may be composed of any suitable magnetic material of high coercive force such as an iron, nickel, aluminum alloy and it is positioned to surround a major portion of the drum stack 9 of the armature 8 with a small uniform air gap therebetween.

As is shown in Fig. 4, the permanent magnet 17 has a magnetization imparted thereto in a predetermined pattern to provide oppositely disposed magnetic poles with concentrated flux densities at the inner surface, the poles being disposed in facing relationship to the armature 8. A single pair of poles are represented in Fig. 4 and lines have been drawn on the end face of the magnet 17 to illustrate flux paths therein by virtue of the permanent magnetization thereof.

Mounted upon each end disc 15 is an annular insulating block 18. Collector rings 19 and 20 in circuit with the commutator 11 and the primary winding of the armature 8 are imbedded in the right hand block 18 and collector rings 21 and 22, in circuit with the commutator 12 and the secondary winding of the armature 8 are embedded in the left hand block 18. Four brushes 23 held by and extending from similar brush holders 24 each bear upon one of the collector rings 19, 20, 21 and 22 to provide an electrical connection between the rotatable field mechanism of the dynamotor and the input terminals 25 and the output terminals 26.

Referring now to Figs. 2 and 3, there is shown therein the details of the commutator brush construction that revolves about the commutators 11 and 12. A pair of studs 27 of a material suitable for conducting the winding currents is mounted in each of the end discs 15. Each stud 27 is electrically joined to a corresponding collector ring 19, 20, 21 or 22 by an appropriate lead 28 passing through the respective insulation block 18. Pivotally mounted upon each of the studs 27 is a brush holder 28 having a brush carrying head 29 and a counterweight 30. A brush 31 is inserted in and held by each head 29 to bear upon the respective commutator 11 or 12. A pigtail lead 32 extends from the cap of each brush 31 to the stud 27 supporting the particular brush 31 and is secured to the stud 27 by means of a lug 33. To maintain brush pressure upon the commutators 11 and 12 a spring 34 is coiled about and secured to each of the studs 27 with an arm 35 thereof extending from the respective stud 27 to engage the respective heads 29 to urge the heads 29 and brushes 31 toward the commutators 11 and 12.

In operation of the dynamotor, connections are made to the terminals similarly as in the case of conventional dynamotors. Input voltage leads are secured to the set of terminals 25 at one end of the housing 6 which are electrically joined through the respective brushes 23, collector rings 19, 20, leads similar to 28, but not shown, stud mounts similar to 27, also not shown, and commutator brushes 31 to the commutator 11 and its associated primary winding. A motor action is thus imparted by reason of the interaction of the current in the primary winding with the flux of the permanent field magnet 17, and the rotatable field structure comprising the magnet 17, field yoke 16, and discs 15 and collector ring mounts 18 are caused to rotate about the armature 8. A generator action consequently ensues which induces currents within the secondary winding of the armature 8 to provide an output potential at the pair of terminals 26.

The output potential is augmented by the transformer relation of the primary and secondary windings. To enhance this augmentation the coupling ring 13 is placed upon the laminations of the armature 8 to surround a portion thereof so as to effect an envelopment of the winding coils within a flux path of low reluctance. The transformer coupling is thus effectively increased by elimination of the air gap which exists in the flux path of conventional machines wherein the windings are disposed in slots which are open throughout their length. The ring 13 further acts to improve voltage regulation and by choosing a magnetic shunt ring 13 of desired permeability characteristic the dynamotor characteristics may be correspondingly altered to meet desired performance requirements.

Enhancement of the transformer action between the primary and secondary windings permits the use of fewer turns in the secondary winding for a given voltage rating under load conditions. This, in turn, allows the use of larger wire size and permits greater wattage rating for the apparatus, or for the same rating the copper requirement and overall size may be reduced advantageously for those applications demanding light weight compact apparatus, such as in the aircraft industry.

Achieving good static and dynamic balance of a rotor armature is necessarily difficult and requires a somewhat tedious operation. Through the use of this invention the balance of moving parts may be readily accomplished. The rotatable field yoke 16 of circular cylindrical configuration has a uniform thickness providing inherent balance. End discs 15 and collector ring mounts 18 are likewise inherently balanced. To further enhance the dynamic balance the permanent magnet 17 is tube shaped with smooth inner and outer circular cylindrical surfaces. These parts may be easily machined to the required dimensions and static and dynamic balance is provided without adjustment or may be achieved with a minimum of adjustment. The dynamic balance as attained through the use of this invention will be preserved through the full range of speed through which the dynamotor must be accelerated in reaching operating speed. Wound rotors, on the other hand, may be balanced satisfactorily for but one speed of rotation, which must of necessity be the intended speed of operation. Rotational forces act upon windings to cause varying displacements sufficient to disrupt a balance at speeds other than the balanced speed. Dynamotor applications call for extensive intermittent use and as wound rotor dynamotors come up to speed or decelerate there is extensive vibration due to the lack of balance, as a result the air gap must be of sufficient size to accommodate such vibrations. In the use of the present invention, however, the rotor balance is preserved at all speeds and the air gap may be accordingly reduced, thus increasing the machine efficiency.

It will be noted that the field magnet 17 has eliminated therefrom any protruding pole faces. Flux concentration at the poles may be consequently detrimentally affected to a degree, however, the air gap between the armature and pole piece faces may be reduced from that of conventional machines, as hereinbefore noted, because of good balance and the simple shapes of the parts so as to gain improved overall efficiency by reduction in the reluctance of the field flux path.

In Fig. 5 there is shown another form of this invention. As in the structure shown in Figs. 1–4 the outer casing comprises a pair of end bells 36 and 37 joined by a channel shaped hoop clamp 38. A non-rotatable shaft 39 extends through the casing and is mounted in shock absorbent grommets 40 of insulating material. Carried on the shaft 39 by ball bearings 41 is a rotor structure 42 similar to that shown in Figs. 1–3. The pole piece 43 of high coercive material which is mounted as part of the rotor 42 is magnetized with the impressed poles following a helical or skewed path as illustratively represented by the phantom lines 44 that outline one of the magnetic poles.

An armature 45 with slots 46 running parallel to the axis is mounted on the shaft 39. Two sets of windings are received by the armature 45 with the high voltage winding being connected to the commutator 47. Two commutator segments 48 and 49 have leads 50 and 51 connected thereto. The leads 50 and 51 pass through the shaft 39 and emerge therefrom for connection with two output terminals 52 and 53 so as to provide a source of high voltage alternating current. If desired additional windings may be wound on the armature 45 to provide a variety of voltage values and slip rings as well as commutators may be employed for collecting the output voltages.

The grommets 40 reduce undesirable transmission of vibrations and act to insulate portions of the electrical system from possible grounds. Wound rotors require a rigid mounting to dampen the undesirable vibrations occurrent upon acceleration up to rated speed and deceleration and usual constructions do not lend themselves to the adaption of such a mounting. If desired the base and mounting ring for the casing may be of rubber or similar material to further insulate the dynamotor and to act as vibration absorbent material.

I claim:

1. In a dynamotor the combination comprising a support member, a shaft carried by said support member, a stator armature having a plurality of armature windings supported by said shaft, said armature having a flux path of magnetic material linked with and surrounding a segmental length of each of said plurality of windings, a rotatable field yoke carried on said shaft having a cylindrical permanent magnet sleeve with a smooth circular cylindrical inner surface surrounding and spaced from said armature, said yoke being permanently magnetized with circumferentially spaced inwardly facing magnetic poles, a plurality of input and output terminals, and electrical connections between said windings and said terminals.

2. In a dynamotor the combination comprising a housing having input and output terminals, a fixed shaft mounted within said housing, an armature having a pair of armature windings and a commutator for each of said windings, said armature having a flux path of magnetic material linked with and surrounding a segmental length of each of said pair of windings, a rotatable field yoke carried on said shaft consisting of a cylindrical permanent magnet sleeve having a smooth circular cylindrical inner surface surrounding and spaced from said armature, said yoke being permanently magnetized with circumferentially spaced inwardly facing areas of opposite polarity, and a plurality of brushes in commutating relationship with the commutators of said armature electrically joined to said input and output terminals.

3. In a dynamotor the combination comprising a housing having input and output terminals, a fixed shaft mounted in said housing, a stator armature concentric with and fixed to said shaft having circumferentially spaced axial extending slots with a pair of armature windings disposed within said slots, a pair of commutators forming a part of said armature, each of said commutators being electrically joined to one of said pair of windings, a rotatable field member concentric with and carried on said shaft, comprising a circular cylindrical sleeve of uniform thickness and annular mounting means therefor of uniform thickness, a circular cylindrical permanent magnet sleeve of uniform thickness having magnetic poles with flux concentrations circumferentially spaced about the smooth inner surface thereof, said permanent magnet being mounted on said field member sleeve for rotation therewith and surrounding said armature in spaced relation thereto so as to pass magnetic flux therethrough, and a plurality of brushes mounted in commutating relation with said commutators being electrically joined with said input and output terminals.

4. In a dynamotor having a slotted armature with a pair of windings disposed within the slots, commutators and commutator brushes electrically joined to said pair of windings, and a magnetic field member having pole faces disposed in flux transmitting relation to said armature to pass a magnetic field therethrough, the improvement comprising a flux path of magnetic material forming a part of said armature linked with and surrounding a portion only of the length of each of said pair of windings.

5. In a dynamotor having a slotted armature with a pair of windings disposed within the slots, commutators and commutator brushes electrically joined to said pair of windings, and a magnetic field member having pole faces disposed in flux transmitting relation to said armature to pass a magnetic field therethrough, the improvement comprising a slotted portion of said armature extending a substantial axial distance beyond said pole faces and an annular metallic flux conveying member surrounding the slotted portion of said armature extending axially beyond said pole faces with an inner face thereof abutting the surface of said armature.

6. In a dynamotor the combination comprising a housing having input and output terminals, a fixed shaft mounted within said housing, a stator armature of magnetic material fixed to said shaft having circumferentially disposed axially extending slots with a pair of armature windings disposed within said slots, a first commutator forming a part of said armature with the segments thereof electrically joined to the turns of one of said pair of armature windings, a second commutator forming a part of said armature with the segments thereof electrically joined to the turns of the other of said pair of armature windings, a magnetic annular flux member surrounding and seated upon a slotted portion of said armature in linking relation to a portion of said pair of windings providing a mutual magnetic path of low reluctance, a rotatable field member comprising a circular cylindrical sleeve of uniform thickness and annular end mountings each of uniform thickness carried upon said shaft and surrounding said armature, a circular cylindrical permanent field magnet sleeve of uniform cross section mounted concentrically within said yoke sleeve for rotation therewith surrounding said armature to pass a magnetic field therethrough, a plurality of brushes carried by said end mountings in commutating relationship with said commutators, collector rings electrically joined to said brushes mounted on said field yoke, and collector brushes joined to said input and output terminals in brushing contact with said collector rings.

7. In a dynamotor the combination comprising a support housing forming a stationary enclosing shell with a pair of oppositely disposed end walls; a shaft within said housing extending between and supported at the ends by said end walls; a stator armature mounted on said shaft with two sets of windings and a pair of commutators one for each set of windings that are disposed at opposite ends of the armature; a field member including a pair of end walls adjacent said commutators rotatably supported by and extending transversely of said shaft, a sleeve of uniform longitudinal cross section extending between said end walls, and a permanent magnet of uniform longitudinal cross section supported by said sleeve surrounding and spaced from said armature; a set of brush holders for each commutator pivotally supported by said end walls for movement about an axis substantially parallel to said shaft with each extending circumferentially to each side of the pivotal support with a brush holding head to one side and a counterweight to the other side; brushes retained by said brush holding heads in commutating relation with said commutators; slip rings mounted on the side of each end wall opposite the brush holder supporting side; electrical connections between each brush and a slip ring, a plurality of pick-up brushes carried by said support housing each in brushing relation to one of said slip rings; and a plurality of input and output terminals mounted on said support housing in electrical connection with said pick-up brushes.

8. A dynamotor in accordance with claim 7 having a pair of supplementary alternating current output terminals mounted by said support housing, and a pair of leads joined to oppositely disposed segments of a commutator extending within said shaft to pass through the adjacent field member end wall and connecting with said supplementary terminals.

References Cited in the file of this patent

UNITED STATES PATENTS

| | | |
|---|---|---|
| 547,683 | Rowland | Oct. 8, 1895 |
| 591,623 | Farnham | Oct. 12, 1897 |
| 743,044 | Spence | Nov. 3, 1903 |
| 826,367 | Schroeder | July 17, 1906 |
| 1,270,421 | Kingsbury | June 25, 1918 |
| 1,393,395 | Pletscher | Oct. 11, 1921 |
| 1,937,677 | Weston | Dec. 5, 1933 |
| 2,071,536 | Kalin | Feb. 23, 1937 |
| 2,278,489 | Rawlings | Apr. 7, 1942 |
| 2,334,153 | Wilson | Nov. 9, 1943 |
| 2,385,742 | Tritt | Sept. 25, 1945 |
| 2,438,621 | Schoeppel | Mar. 30, 1948 |
| 2,474,210 | Abbott | June 28, 1949 |
| 2,553,292 | Barrett | May 15, 1951 |
| 2,595,349 | Fox | May 6, 1952 |

FOREIGN PATENTS

| | | |
|---|---|---|
| 335,144 | France | Jan. 12, 1904 |
| 514,020 | Great Britain | Oct. 27, 1939 |